United States Patent [19]

de Freitas Couto Rosa et al.

[11] Patent Number: 4,867,116
[45] Date of Patent: Sep. 19, 1989

[54] AIRCRAFT EXHAUST VALVES

[75] Inventors: Eduardo de Freitas Couto Rosa, Cincinnati, Ohio; Gaylord D. Smith, Huntington, W. Va.

[73] Assignee: Inco Alloys International, Inc., Huntington, W. Va.

[21] Appl. No.: 198,188

[22] Filed: May 23, 1988

[51] Int. Cl.$^4$ ............................................... F01L 3/00
[52] U.S. Cl. ............................... 123/188 AA; 251/358
[58] Field of Search .................. 123/188 AA; 251/358

[56] References Cited

U.S. PATENT DOCUMENTS 2,664,873  1/1954  Graham ........................ 123/188 AA

FOREIGN PATENT DOCUMENTS 93105  5/1985  Japan ........................... 123/188 AA

OTHER PUBLICATIONS

"Engine Valves etc.", J. M. Larso et al., Journal of Engineering for Gas Turbines and Power, Oct. 1987, pp. 355-361.
Weldability of Ni$_3$Al-Type Aluminide Alloy, Santella et al., citation unknown, pp. 495-503.
Welding & Weldability of Ni/FE Aluminides, David et al., Welding Research Supp., Jan. 1985, pp. 225-285.

*Primary Examiner*—E. Rollins Cross
*Attorney, Agent, or Firm*—Raymond J. Kenny; Francis J. Mulligan, Jr.

[57] ABSTRACT

A spark-ignited internal combustion engine exhaust valve having on critical surfaces thereof, e.g. on the stem where exhaust gases impinge, an aluminide from the group of nickel and titanium aluminides.

6 Claims, 1 Drawing Sheet

AIRCRAFT EXHAUST VALVES

The present invention is concerned with exhaust valves and, particularly, with exhaust valves used in reciprocating spark ignition, internal combuston aircraft engines.

PROBLEM

As of today, exhaust valves used in spark ignition, reciprocating, internal combustion aircraft engines (hereinafter called air engines) are made of a nickel-base superalloy sold under the trademark NIMONIC TM 80A which has a nominal chemical composition in weight percent of 19.5% chromium, 1.4% aluminum, 2.4% titanium, 0.3% manganese, 0.3% silicon, 0.06% carbon, 0.003% boron, 0.06% zirconium, balance, about 76%, nickel. According to the article Engine Valves-Design and Material Evolution by Larson et al, Journal of Engineering for Gas Turbines and Power, October 1987, Vol. 109, pp. 355-361, "... and NIMONIC 80A is still the material of choice for reciprocating aircraft engines." Very recently, it has been discovered that aircraft engine valves made of NIMONIC TM 80A alloy are suffering severe corrosion-erosion effects on the valve stem at or about the locus of higher temperatures as shown by Larson et al in their FIG. 1. It has been suggested that these corrosion-erosion effects have occurred when the aircraft engines involved have been fueled with gasolines containing excessive amounts of tetraethyl lead and ethylene bromide.

As is discussed by Larson et al, aircrat engine exhaust valves are subject not only to relatively high temperatures in a corrosive atmosphere but also to cyclic tensile and bending stresses which, together with a pulsating, high velocity, exhaust gas stream, cooperate to provide ideal conditions for localized erosive-corrosive attack when a corroding medium is present. Excessive amount of an organo-lead compound, e.g. tetraethyl lead and an organo-bromine compound, e.g. ethylene dibromide in the fuel can produce oxidic and bromide products in the exhaust gas stream which products can form molten material in the temperature range of 600° C. and higher. Corrosion tests carried out at 660° C. in an atmosphere made up in parts by volume of 1 hydrogen bromide, 10 carbon monoxide, 10 oxygen and 79 nitrogen have shown that nickel-base high temperature alloys such as those sold under the trademarks NIMONIC TM 80A, UDIMET TM 700, INCONEL TM alloy 718, NIMONIC TM alloy 105 and INCONEL TM alloy 617 are substantially resistant to corrosion in this atmosphere. However, when the same metals, at the same temperature, in the same atmosphere are initially placed in contact with a lead carbonate-alumina mixture (2% lead carbonate) massive corrosion takes place in a short time.

OBJECT OF THE INVENTION

It is an object of the invention to provide a novel aircraft engine exhaust valve resistant to the effects of corrosion exacerbated by the presence of excess lead and bromine in the exhaust gas stream.

DRAWINGS

DESCRIPTION OF THE INVENTION

The present invention contemplates a spark-ignited engine poppet exhaust valve having a stem. At least a part of the surface of the stem upon which exhaust gases impinge is made of an intermetallic compound from the group consisting of nickel aluminides and titanium aluminides. Advantageously additional areas of the valve can also have such intermetallic compounds on their surface.

Figure 1:
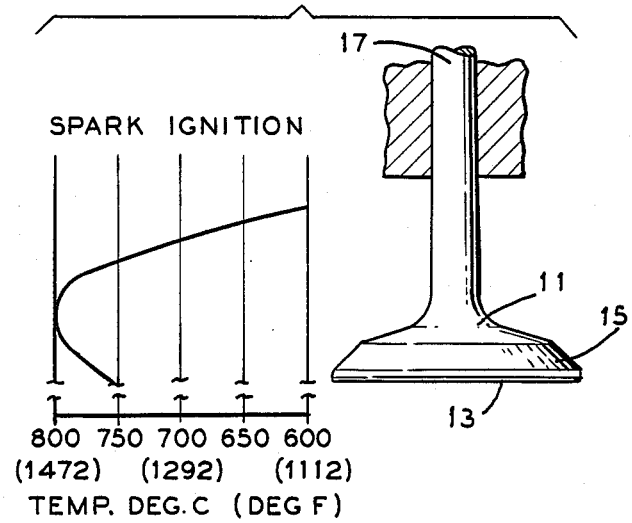
FIG. 1 is a temperature profile-schematic cross-sectional view of an aircraft exhaust valve adapted from FIG. 1 of Larson et al (supra).
Figure 2:
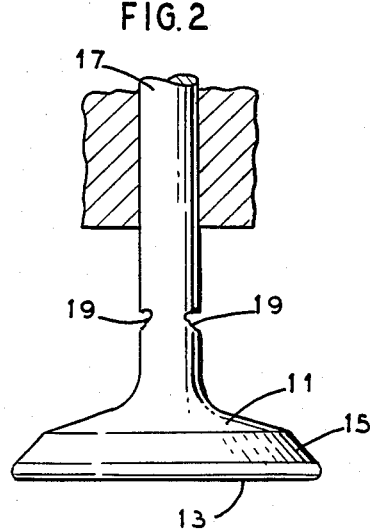
FIG. 2 is a schematic cross-sectional view of an aircraft exhaust valve depicting the nature of localized corrosion-erosion.
Figure 3:
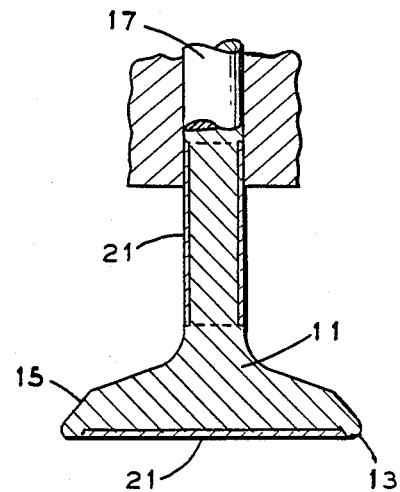
FIG. 3 is a schematic cross-sectional view of an aircraft exhaust valve in accordance with the present invention.

The exhaust valve of the present invention, particularly an aircraft engine exhaust valve, is of conventional poppet design as depicted in the three figures of the drawing. Referring now thereto valve 11 is made of a high temperature resisting alloy which contains about 15-22% chromium, small amounts, e.g. up to 7% total aluminum plus titanium with the balance being nickel along with optional amounts of cobalt, gamma phase matrix hardeners, gamma prime phase modifiers, manganese, silicon, carbon, boron, zirconium, etc. Valve 11 encompasses valve face 13, valve seat abutment surface 15 and stem 17. As depicted in FIG. 1 and adopted from the Larson et al publication supra, valve 11 including stem 17 encounters a profile of temperature which peaks along the length of stem 17. As shown in FIG. 2 severe localized corrosion and erosion occurs on stem 17 at about locus 19 where exhaust gas directed by surface 15 and valve seat (not depicted) impinges on stem 17. A version of valve 11 of the present invention is depicted in FIG. 3 wherein a layer 21 of nickel aluminide about 0.012 to 0.1 cm thick is provided on the surface of stem 17 inclusive of locus 19, i.e. the area of exhaust gas impingement. The valve of FIG. 3 is substantially immune to the corrosion-erosion depicted in FIG. 2. It is also advantageous for valve 11 to have an aluminide coating on other surfaces such as coating 21 on face 13.

For optimum results, the nickel aluminide (or titanium aluminide) coating 21 is about 0.05 cm thick. With respect to nickel aluminide $Ni_3Al$ and other aluminides, it is within the ambit of the present invention to include not only stoichiometric compositions such as $Ni_3Al$, NiAl, TiAl and $TiAl_3$ but also non-stoichiometric compositions which have the crystal structure of the particular intermetallic compound. For example, NiAl can contain about 65 to 76 weight % nickel, balance aluminum, $Ni_3Al$ can contain about 85 to 88% nickel, balance aluminum; TiAl can contain about 35 to 45% aluminum, balance titanium and $TiAl_3$ can contain about 63% aluminum, balance titanium. In addition, to off-stoichiometry, the intermetallic can contain foreign elements. For example, $Ni_3Al$ can contain up to about 8% chromium and/or up to 3% titanium, niobium or tantalum in replacement of aluminum. $Ni_3Al$ can also contain small amounts of elements such as boron, zirconium, iron, manganese and carbon which can function to improve or enhance certain properties and can contain dispersoids such as yttrium-containing oxide, alumina, etc. The aluminide layer 21 can be provided on valve 11 by any conventional means such as weld deposition, flame spraying, plasma arc spraying and the like. In addition, a thicker layer of aluminide can be provided by forming the aluminide into a tube, fitting the tube around a cylindrical workpiece of valve-forming metal and hot working the valve-forming metal, e.g. NIMONIC ™ 80A alloy, and aluminide to form stem 17 as a composite with the aluminide on the exterior metallurgically bonded to a core of the valve-forming metal. To obtain the very best of results it is highly advantageous to conduct deposition and/or working processes to provide a grain size of about 90 micrometers or less in the aluminide coating although a grain size up to about 250 micrometers can give satisfactory results.

The problem solved by the present invention was observed on aircraft engine valves in the form of corrosion-erosion as shown in FIG. 2 of the drawing. A series of tests were conducted at 660° C. in a synthetic exhaust atmosphere made up, by volume, of 1% HBr, 10% CO, 10% $O_2$ with nitrogen being the balance. In these tests four heat resistant alloys having nominal compositions in weight percent as set forth in Table I were subjected to the action of this atmosphere.

TABLE I

| Alloy No. | Cr | Al | Ti | Mn | Si | C | B | Zr | Co | Mo | Nb | Ni |
|---|---|---|---|---|---|---|---|---|---|---|---|---|
| 1 | 19.5 | 1.4 | 2.4 | 0.3 | 0.3 | 0.06 | 0.003 | 0.06 | — | — | — | Bal. |
| 2 | 15.5 | 4.3 | 3.5 | — | — | 0.08 | 0.030 | — | 18.5 | 5.2 | — | Bal. |
| 3 | 19.0 | 0.5 | 0.9 | 0.2 | 0.2 | 0.04 | — | — | — | 3.0 | 5.1 | Bal.* |
| 4 | 22.0 | 3 | — | — | — | 0.07 | — | — | 12.5 | 9.0 | — | Bal.** |

*Includes 18.5 Fe
**Includes 0.04 Y

In the first series of tests the alloys of Table I were exposed to the atmosphere alone. In the second series the alloys were exposed to the atmosphere in the presence of lead supplied as 2% by weight lead carbonate in powdered alumina in which metallic specimens were partially embedded. Table II sets forth the results of these series of tests.

TABLE II

| | | Cumulative Undescaled Change in Weight (mg/cm$^2$) | | |
|---|---|---|---|---|
| | | | Time | |
| Series | Alloy | 24 Hrs. | 48 Hrs. | 120 Hrs. |
| 1 | 1 | 0.0548 | −0.0366 | −0.1461 |
| 1 | 2 | 0.0729 | 0.0547 | −0.0547 |
| 1 | 3 | 0.0000 | −0.0954 | −0.3180 |
| 1 | 4 | 0.1909 | 0.1736 | 0.1562 |
| 2 | 1 | −6.6426 | −8.2120 | −9.9275 |
| 2 | 2 | −8.2900 | −9.5738 | −10.6926 |
| 2 | 3 | −13.3508 | −16.6952 | — |
| 2 | 4 | −6.7064 | −8.1220 | −10.9885 |

The data in Table II shows that although alloys 1 to 4 exhibited at least substantial resistance to the test atmosphere at 660° C. in the absence of lead, in the presence of lead all of these alloys exhibited severe corrosion. In contrast, a nickel aluminide hereinafter identified as Aluminide 2 had only a cumulative change in weight of −0.0708 after 72 hours of exposure to the same atmosphere in the presence of lead. Thus, under these conditions Aluminide 2 is roughly 100 times more corrosion resistant than the heat resistant alloys of Table I.

Three aluminide compositions as set forth in weight percent in Table III were tested at a higher temperature against Alloy No. 1, the alloy deemed the standard for exhaust valve use.

TABLE III

| Aluminide No. | Ni | Cr | Al | B | Zr | $Y_2O_3$ | Co | C | Mn |
|---|---|---|---|---|---|---|---|---|---|
| 1 | Bal. | 7.8 | 8.5 | 0.02 | 0.8 | 0.110 | — | — | — |
| 2 | Bal. | 7.6 | 8.1 | 0.02 | 0.78 | 0.008 | 0.04 | 0.06 | 0.01 |
| 3 | Bal. | 7.8 | 8.5 | 0.02 | 0.8 | 0.95 | — | — | — |

The test conditions involved the same atmosphere and presence of lead as in Series 2 reported in Table II but at the high temperature of 816° C. After 336 hours exposure the results set forth in Table IV were observed.

TABLE IV

| Specimen Identification | Undescaled Corrosion Rate mg/(cm$^2$ · hr.) |
|---|---|
| Aluminide No. 1 | + 0.0018 |
| Aluminide No. 2 | + 0.0085 |
| Aluminide No. 3 | − 0.0147 |
| Alloy No. 1 | − 0.0459 |

Under the higher temperature (816° C.) test conditions, the results reported in Table IV show that Aluminides Nos. 1 and 2 which had grain sizes less than about 90 micrometers were significantly more corrosion resistant than Aluminide No. 3 which had a grain size of about 200 micrometers. Even so, Aluminide No. 3 was about 3 times more corrosion resistant than Alloy No. 1. The data in Table IV and that regading Aluminide 2 when tested at 660° C. clearly show the utility of the exhaust valves of the present invention as depicted in the drawing.

It is advantageous for aluminide to be weld deposited as a surface coating on stem 17, face 13 and on any other desired surface of valve 11. Weld deposition by electron beam welding at speeds up to about 50 mm/s have been found by others to be practical when the boron content of the aluminide is about 0.02%. The precise conditions of welding are important not only in order to provide crack-free surface deposits of aluminide but also to produce the small grain sizes in such surface deposits so as to provide enhanced corrosion resistance.

While in accordance with the provisions of the statute, there is illustrated and described herein specific embodiments of the invention, those skilled in the art will understand that changes may be made in the form of the invention covered by the claims and that certain features of the invention may sometimes be used to advantage without a corresponding use of the other features.

The embodiments of the invention in which an exclusive property or privilege is claimed are defined as follows.

What is claimed is:

1. An exhaust valve for a spark-ignited, internal combustion engine operating on fuel containing an organo-lead compound and an organo-bromide comprising a valve body and stem of poppet design made of a high temperature resisting alloy having at least part of the surface of said stem upon which exhaust gases impinge made of an intermetallic compound from the group consisting of nickel aluminides and titanium aluminides.

2. An exhaust valve as in claim 1 wherein said at least part of the surface of said stem is made from a nickel aluminide.

3. An exhaust valve as in claim 2 wherein said nickel aluminide has the crystal structure of $Ni_3Al$.

4. An exhaust valve as in claim 2 wherein said nickel aluminde surface is a layer about 0.012 to about 0.1 cm thick.

5. An exhaust valve as in claim 2 wherein said nickel aluminide has a grain size of about 250 micrometers or less.

6. An exhaust valve as in claim 5 wherein said nickel aluminide has a grain size of about 90 micrometers or less.

* * * * *